US010395544B1

(12) United States Patent
Harris et al.

(10) Patent No.: US 10,395,544 B1
(45) Date of Patent: Aug. 27, 2019

(54) ELECTRONIC LANDING MARKER

(71) Applicant: Amazon Technologies, Inc., Seattle, WA (US)

(72) Inventors: Scott Raymond Harris, Bainbridge Island, WA (US); Jason Leonard Peacock, Bellevue, WA (US); Varsha Raghavan, Seattle, WA (US); Paul Viola, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 15/249,947

(22) Filed: Aug. 29, 2016

(51) Int. Cl.
| | |
|---|---|
| B64D 1/02 | (2006.01) |
| G08G 5/02 | (2006.01) |
| B64C 39/02 | (2006.01) |
| B64D 45/04 | (2006.01) |
| G06Q 10/08 | (2012.01) |

(52) U.S. Cl.
CPC ............. *G08G 5/02* (2013.01); *B64C 39/024* (2013.01); *B64D 1/02* (2013.01); *B64D 45/04* (2013.01); *G06Q 10/083* (2013.01); *B64C 2201/128* (2013.01); *B64C 2201/145* (2013.01); *B64C 2201/146* (2013.01); *B64C 2201/18* (2013.01)

(58) Field of Classification Search
CPC .. G08G 5/02; B64C 39/024; B64C 2201/128; B64C 2201/145; B64C 2201/146; B64C 2201/18; B64D 1/02; B64D 45/04; G06Q 10/083
USPC ........................................................ 701/2
See application file for complete search history.

(56) References Cited

U.S. PATENT DOCUMENTS

| | | | | |
|---|---|---|---|---|
| 9,969,494 | B1* | 5/2018 | Buchmueller | B64D 47/08 |
| 2014/0136414 | A1* | 5/2014 | Abhyanker | G06Q 50/28 |
| | | | | 705/44 |
| 2014/0180914 | A1* | 6/2014 | Abhyanker | G01C 1/00 |
| | | | | 705/39 |
| 2015/0142211 | A1* | 5/2015 | Shehata | H04N 7/181 |
| | | | | 701/2 |
| 2015/0149000 | A1* | 5/2015 | Rischmuller | B64C 39/024 |
| | | | | 701/7 |
| 2016/0033966 | A1* | 2/2016 | Farris | G01C 21/00 |
| | | | | 701/15 |
| 2016/0117853 | A1* | 4/2016 | Zhong | B64C 39/024 |
| | | | | 345/634 |
| 2017/0267347 | A1* | 9/2017 | Rinaldi | B64D 1/22 |
| 2018/0186454 | A1* | 7/2018 | Luckay | B64D 1/12 |
| 2019/0064794 | A1* | 2/2019 | Chen | G05D 1/0016 |

* cited by examiner

*Primary Examiner* — Atul Trivedi
(74) *Attorney, Agent, or Firm* — Lee & Hayes, P.C.

(57) ABSTRACT

An electronic marker may provide an approach notification to enable people to understand and interpret actions by a UAV, such as an intention to land or deposit a package at a particular location. The marker may communicate a specific intention of the UAV and/or communicate a request to a person. The marker may monitor the person or data signals for a response from the person, such as movement of the person that indicates a response. The marker may be equipped with hardware and/or software configured to provide notifications and/or exchange information with a person or the UAV at or near a destination. The marker may include a display, lights, a speaker, and one or more sensors to enable the UAV to provide information, barcodes, and text. The marker can provide final landing authority and can "wave-off" the UAV if an obstacle or person exists in the landing zone.

20 Claims, 12 Drawing Sheets

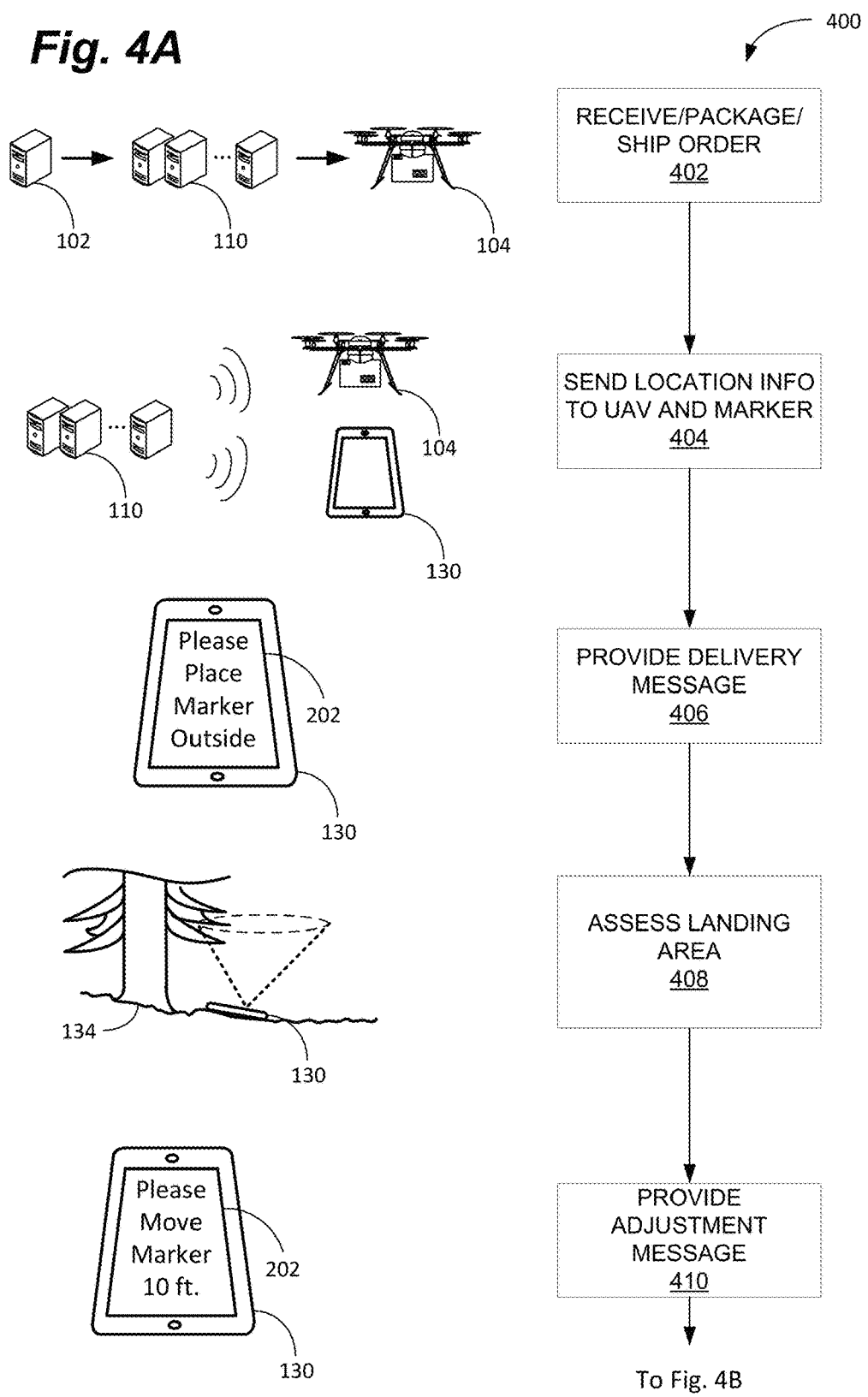

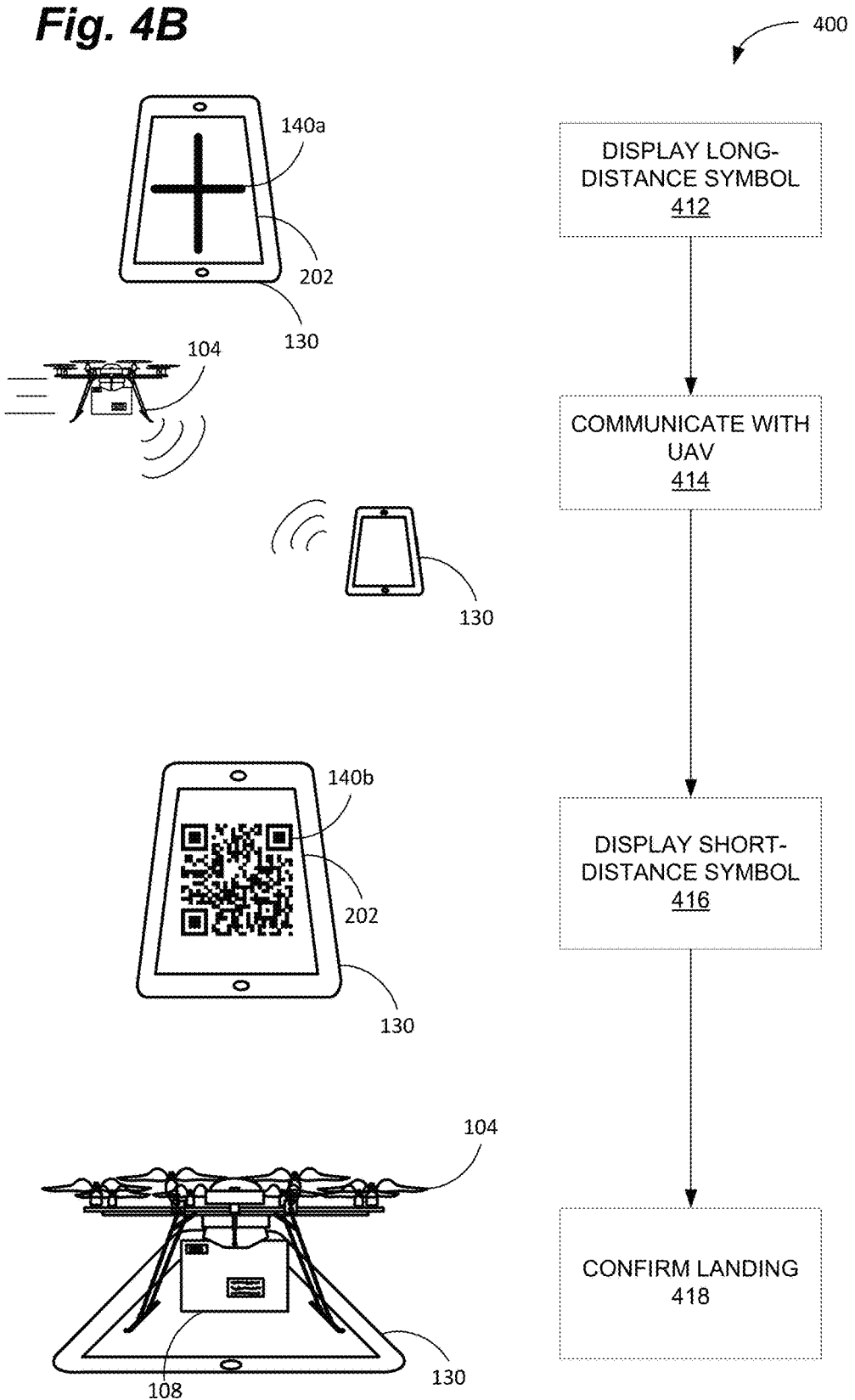

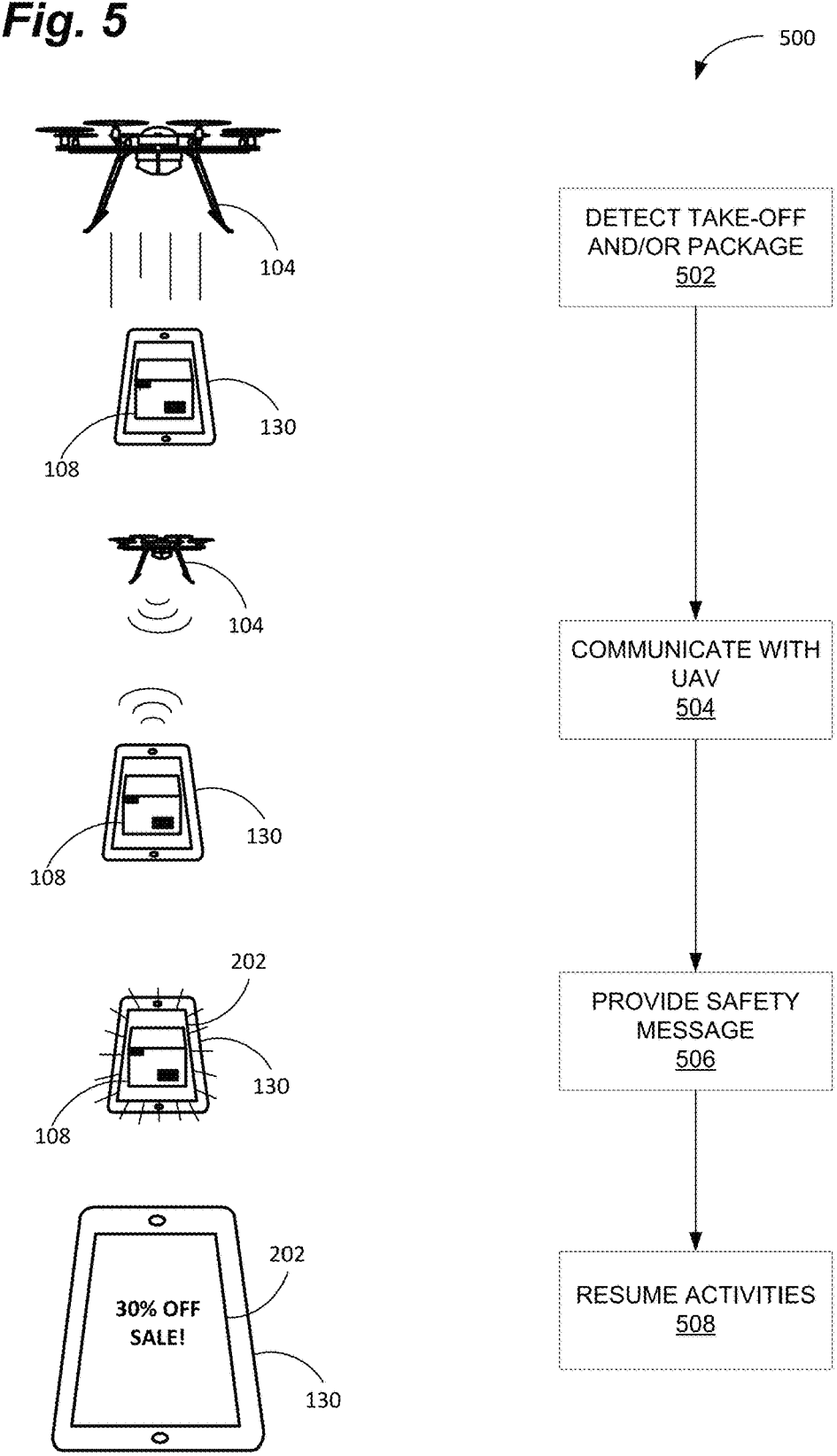

ELECTRONIC LANDING MARKER

BACKGROUND

Unmanned aerial vehicles (UAVs), along with robots and other autonomous objects, are being used to perform tasks that were previously performed by people. For example, a UAV may deliver a package to a residence instead of a courier delivering the package. When people perform tasks, the people often abide by social norms. For example, the courier may enter personal property using a walkway that leads to a front door, a mailbox, or porch when delivering a package. The courier may knock on a door, ring a doorbell, or take other action to announce his/her presences at the residence. However, UAVs may enter airspace above a property and deposit a package somewhere on that property. In the scenario where the UAV delivers the package, social norms and/or customs may not be pre-established. Thus, a property owner or resident of property may be alarmed or confused when a UAV approaches the property.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 4A and 4B are flowcharts depicting a landing process for the UAV using the electronic marker, in accordance with some examples of the present disclosure.

FIG. 5 is a flowchart depicting a takeoff process for the UAV using the electronic marker, in accordance with some examples of the present disclosure.

DETAILED DESCRIPTION

Examples of the present disclosure are related to an electronic marker, or simply "marker," for use with a UAV delivery system, among other things. The marker can include a display to provide messages to the user 136 and the UAV, speakers and/or lights to communicate with the user 136, and one or more sensors to provide information to the user 136 and/or an approaching UAV. The marker can be placed outside a delivery area to enable a UAV to navigate to, and land on or near, the marker.

When a user 136 orders products online, for example, the products can be delivered to the user 136 using a UAV. UAVs may be equipped with GPS navigation, for example, but may require some additional guidance in the landing location. This may be due to some inherent lack of accuracy in GPS guidance systems, for example, or where conditions in the landing area are unknown. To this end, the online ordering system, UAV, and marker can work in concert to communicate with the user 136 and to enable the UAV to safely and accurately deliver the package to the user 136. When not in use, the marker can also serve additional purposes, such as providing web browsing, multi-media, and advertising, among other things.

The techniques, markers, and systems described herein may be implemented in a number of ways. Example implementations are provided below with reference to the following figures.

Figure 1:
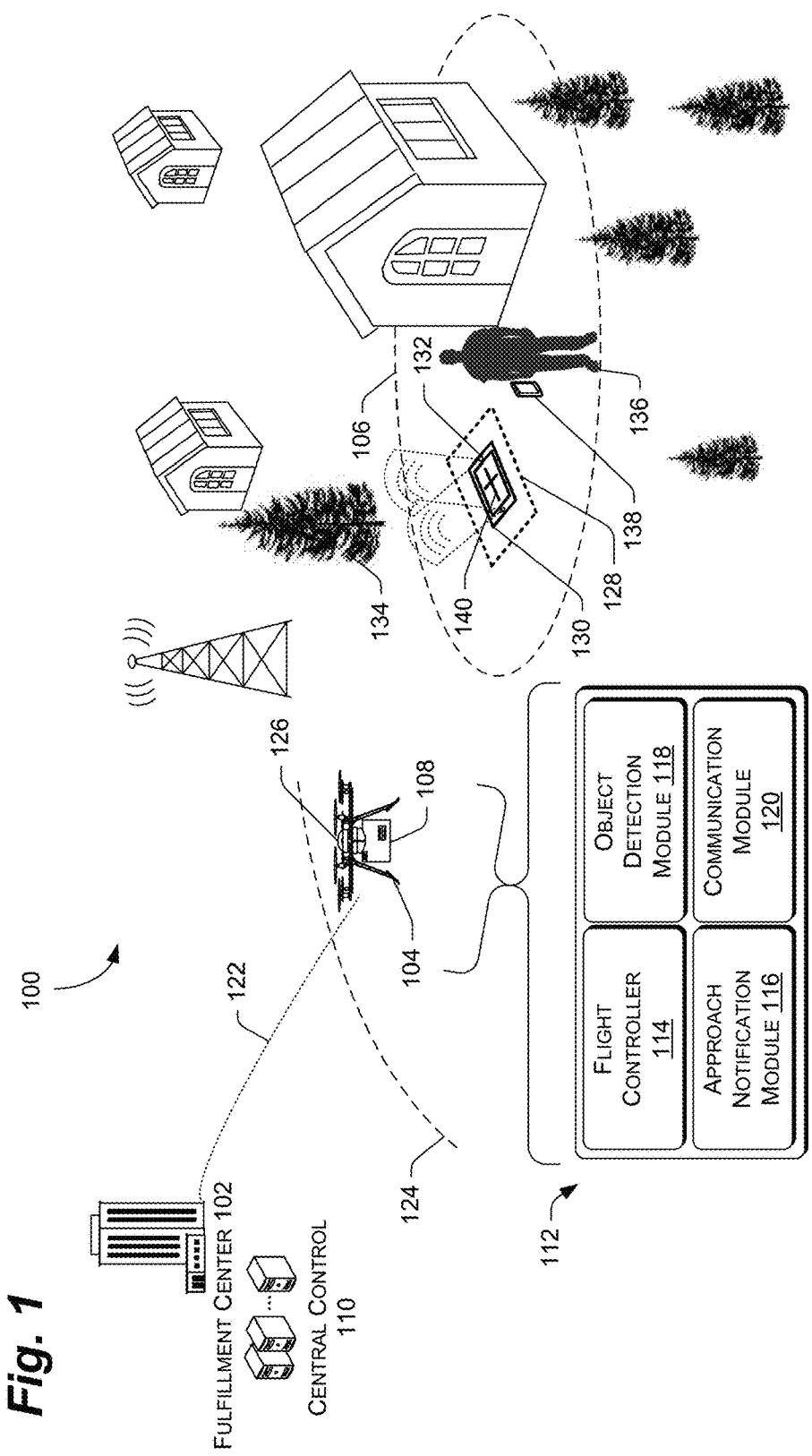
FIG. 1 is a schematic diagram of an illustrative environment that includes an unmanned aerial vehicle (UAV) delivery system, in accordance with some examples of the present disclosure.

FIG. 1 is a schematic diagram of an illustrative delivery system 100 that includes an electronic marker for providing information to an approaching UAV and/or a person at the landing location. The delivery system 100 includes a fulfillment center (FC) 102 for receiving orders from customers and for packaging and preparing these orders for shipment. The UAV 104 may originate a flight directed to a delivery location 106 from the FC 102 after being loaded with a package 108 for delivery, if applicable, and provided with data related to the delivery location 106 (e.g., GPS data, routing data, etc.). The delivery location 106 can be a location associated with a recipient of the package 108 that is being transported by the UAV 104 such as, for example, the recipient's home or work.

The UAV 104 may receive flight information, routes, weather data, and/or commands from a central control 110. The central control 110 can communicate with the UAV 104 via a wireless network, such as a network that utilizes one or more antennas and/or other hardware (e.g., cellular, Wi-Fi, FRS, GMRS, etc.). The UAV 104 may also, at times, conduct autonomous flight, using GPS, cellular location services, LORAN, and other navigational means. This may be useful, for example, when the UAV 104 is out of range of both the central control 110 and the delivery location 106.

The UAV 104 may be equipped with a number of components 112 to enable the UAV 104 to perform the delivery of the package 108. The components 112 may include, for example, a flight controller 114, an approach notification module 116, an object detection module 118, and a communication module 120, as well as other components discussed below with reference to FIG. 3.

The UAV 104 may travel, under control of the flight controller 114, along a flight path 122 toward the delivery location 106. Eventually, the UAV 104 may reach or cross a threshold distance 124 from the delivery location 106, which may be detected by the flight controller 114 and/or a navigation system. The UAV 104 may determine that the UAV 104 has reached or crossed the threshold distance 124 from the delivery location 106 based on, for example, GPS data, cellular location services, and/or based on signals received by onboard sensors (e.g., proximity sensors, imaging sensors, transceivers, etc.). In some examples, the threshold distance 124 may be a certain distance away from, or above, the delivery location 106 (e.g., within 100, 200, or 300 yards). In other examples, the threshold distance 124 may instead be a location over an adjacent property, for example, a point of no return, or other significant location. In some examples, the UAV 104 may be executing, via the flight controller 114, an approach flight maneuver when the UAV 104 reaches or crosses the threshold distance 124.

The UAV 104 may use one or more sensors 126 to detect a landing zone 128 using a marker 130 and other visual, electronic, or navigational clues. As discussed in more detail below, the UAV 104 can use the marker 130 to designate the landing zone 128, provide communications, and to act as a landing pad to deposit the package 108 at the delivery location 106. The marker 130 can designate the landing zone 128, which may be a landing zone, or may be a location where the package is to be deposited or dropped onto while the UAV 104 remains in flight (without landing). The landing zone 128 may be designated by the marker 130 and, in some examples, the marker 130 can provide additional information to the UAV as it approaches.

The marker 130 can be a portable electronic device, such that a person can place the marker 130 in an appropriate location outside. The sensors 126 (e.g., a camera, radio, or other means) on the UAV 104 may detect the marker 130 in addition to other methods, such as by GPS coordinates or as a specific feature (porch, deck, walkway, etc.). In some examples, the marker 130 can display a bar code, quick-response (QR) code, password, or other encoded information to enable the UAV 104 to verify its location and to authenticate the marker 130 (e.g., when multiple markers 130 are within close proximity to each other). In some examples, the marker 130 can also communicate flight conditions, landing conditions, and other information either visually on a configurable display (e.g., an LED, electronic ink, or LCD display) or via direct or indirect wireless communications. In some examples, the marker 130 may begin communications with the UAV 104, and may change its display or other output, in response to the UAV 104 crossing the threshold distance 124.

The marker 130 can include one or more sensors 132, such as a camera or proximity sensor for example, to detect an obstacle 134, such as a tree, dog, person, fence, clothesline, or any other object that may interfere with the UAV 104 at the delivery location 106. The sensors 132 may detect presence of a user 136, who may be a recipient of the package 108, a bystander, a resident at the delivery location 106, and/or another person. The user 136 may, or may not, be on the property associated with the delivery location 106, but may be located proximate to the property, such as on a neighboring property, a sidewalk or other public property, or at some adjacent location.

The approach notification module 116 may cause the UAV 104 to perform one or more actions during the approach toward the delivery location 106. The approach notification module 116 can inform the marker 130 about intentions and/or actions of the UAV 104 and/or make a request to the person and/or otherwise communicate with the person via the marker 130, possibly using the communication module 120. The approach notification module 116 and/or UAV 104 may cause lights or a screen to be activated on the marker 130 in a predetermined manner to indicate that the UAV 104 is on an approach and intends to land or deposit the package 108 at the delivery location 106. The marker 130 may "announce" the arrival of the UAV 104 via the lights, screen, and/or audio on the marker 130, such as by emitting a warning sound, a pleasant tone, voice commands, or other audio that provides notification of the presence of the UAV 104 and/or an intent of the UAV 104 to deposit the package 108 at the delivery location 106.

In some examples, the marker 130 may project light, patterns, messages, or other information, to provide the UAV 104 and user 136 with information necessary for the UAV 104 to land. For example, the landing zone 128 may not be otherwise marked, but may exist as a GPS coordinate or other location, which can be marked or made visible by the marker 130 displaying a pattern. On approach, the marker 130 may alternate between a pattern for guiding the UAV 104, an estimated time of arrival (ETA) message for the person, and a warning light for the person to keep clear of the landing zone 128, among other things. In some examples, one or more of the patterns on the marker 130 may contain information relevant to the UAV 104 for approach and/or landing.

In various examples, the approach notification module 116 may inform the marker 130 of the UAV's 104 imminent arrival, position above the landing zone 128, or altitude, among other things. This may cause the marker 130 to change display patterns to display a landing pattern, for example, to provide information, and/or to provide authentication to the UAV 104 (e.g., to verify that the UAV 104 is at the correct delivery location 106). The landing pattern on the marker 130 may cause the UAV 104 to perform special maneuvers and/or controls based on the conditions at the landing zone 128 (e.g., wind, rain, tilt, or elevation changes). For example, the UAV 104 may have to land in a landing zone 128 that is slightly tilted (or sloped) or in an area with a significant cross wind. The marker 130 can provide local, accurate information to enable the UAV 104 to safely land.

In some examples, the communication module 120 may send and receive messages between the UAV 104 and central control 110 and between the UAV 104 and the marker 130. The marker 130 can, in turn, communicate with the UAV 104 and/or the user 136, including requesting a response from the user 136. For example, in response to the sensors 132 on the marker 130 detecting an obstacle, the marker 130 may (1) provide a message to the UAV 104 to hold its position and (2) display a message to the user 136 to remove the obstacle. If the object is movable (e.g., put a dog in the house, turn off a sprinkler, etc.), the marker 130 may simply ask the user 136 to move or turn off the object. If this object is immovable (e.g., a tree 134) on the other hand, the marker 130 may ask the user 136 to move the marker 130 to a more suitable location. The marker 130 may display a message that simply says, for example, "Please move the marker 10 feet closer to the house to clear the obstacle."

The communication module 120 may communicate with the marker 130, the user 136, the central control 110, and other entities by sending wireless signals, including to an electronic device 138 (e.g., cell phone) or computer associated with the user 136. The communication module 120 may send a short message service (SMS) text message, a multimedia messaging service (MMS) message, an email, and/or other type of message, for example, to a web address or phone number associated with the marker 130 or the user 136 (e.g., the recipient of the package, a resident at the delivery location 106, etc.). The communication module 120 may also transmit messages to the marker 130 and/or the electronic device 138 using other techniques and message services, such as via Bluetooth®, Wi-Fi, cellular, and/or via other techniques.

In some examples, the marker 130 may also be connected to a LAN at the delivery location 106 (e.g., a Wi-Fi connection) and may be in communication with the central control 110 and the UAV 104 simultaneously. In this manner, the marker 130 can provide updates to the UAV 104 and/or central control 110 and to act as a relay between the UAV 104 and the central control 110 when the UAV 104 is otherwise out of communication with the central control 110.

As discussed in more detail below (FIG. 4B), in some examples, the marker 130 may display one or more symbols 140 to enable the UAV 104 to land safely at the delivery location 106. In some examples, the marker 130 can include one or more long-distance symbols 140a intended to enable the UAV 104 to locate the marker 130 from relatively long distances and to distinguish the marker 130 in the delivery location 106 from other nearby markers 130. The marker 130 can also display a short-distance symbol 140b to provide additional information to the UAV 104 related to landing, authentication, and more.

Figure 2A:
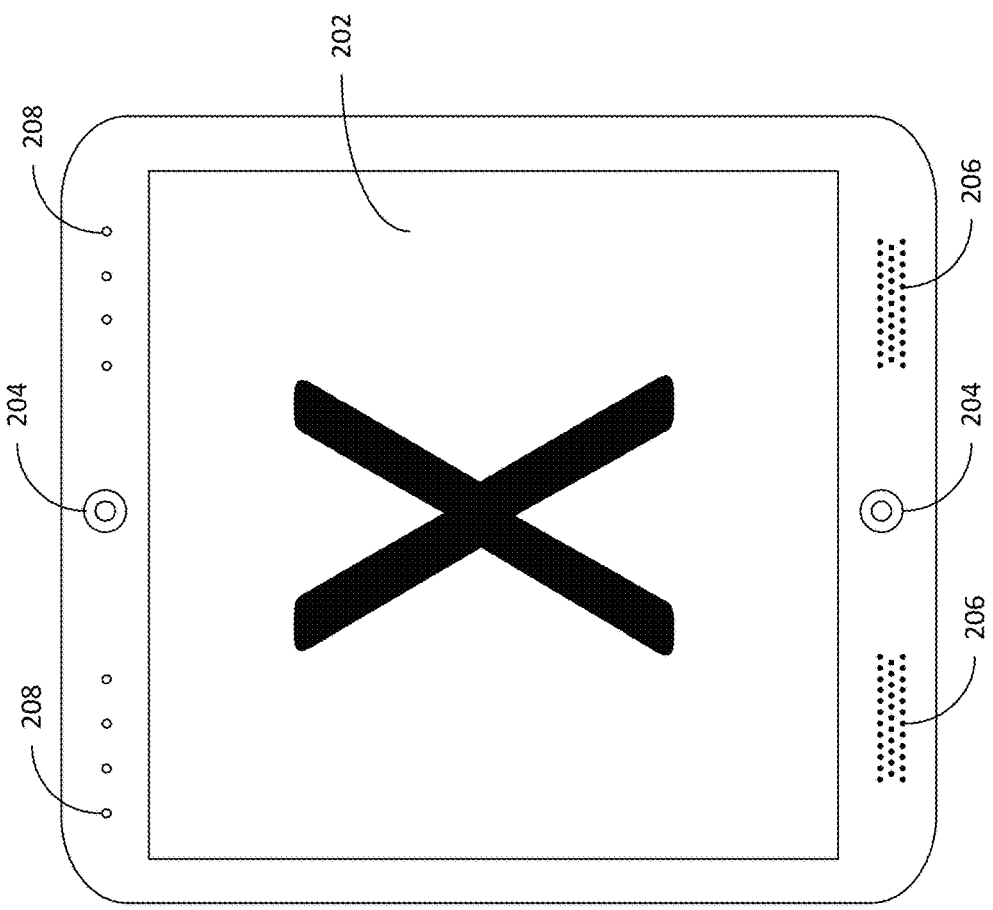
FIG. 2A is depicts an exterior portion of an electronic marker for use with the delivery system of FIG. 1, in accordance with some examples of the present disclosure.

As shown in FIG. 2A, examples of the present disclosure can comprise an electronic marker, or simply marker 130, to act as a landing beacon. The marker 130 can include a number of features to enable it to communicate with the UAV 104, or other vehicles, designed to deliver packages to a location (e.g., a business or home). The marker 130 can also include one or more features to enable it to communicate with a customer, either directly using audio and/or visual messages, or via a wireless network or other means. The packages 108 may be products ordered from an online retailer, for example, mail, medical supplies, or other goods. The marker 130 can provide location information, for example, authentication codes, warning messages, and ETAs, among other things, to the UAV 104, the central control 110, and/or the customer.

As shown, the marker 130 can include a number of external features. The marker 130 can include, for example, a display 202, one or more sensors 204, one or more speakers 206, and one or more external lights 208. In some examples, the display 202 can comprise any standard electronic screen such as, for example, an electronic ink, LCD, LED, or TFT screen. As discussed below, the display 202 can be used to display patterns (e.g., bar codes, landing patterns, or QR codes), provide messages to the customer (e.g., "Warning: UAV Approaching! Stand Back!"), and to act as a beacon for the UAV 104.

In some examples, when not in use as a marker 130, the display 202 can also be used to display delivery times, advertising, websites, and other visual media. When not in use, the marker 130 may display marketing materials, for example, related to a pending or past order of the user 136, sales or other promotions for the online retailer, or paid advertising from various vendors. If the user 136 has previously ordered a particular brand of shoes, for example, the marker 130 may display a sales circular related to that brand. In other examples, the marker 130 may include a touch-screen and can act as a tablet computer when not in use. When a delivery is imminent, however, the marker 130 may provide reminders, a countdown based on the estimated time of delivery (ETD) of the package 108, or other relevant information.

In some examples, the sensors 204 can include a number of sensors designed to provide information to the marker 130, customer, and/or the UAV 104. The sensors 204 can be used to identify issues in the landing zone 128 such as, for example, obstacles, uneven or sloping ground, heavy rain or wind, or other conditions that would prevent a safe landing. These issues can also include people or animals proximate the landing zone, soft or saturated ground, or lighting conditions that would prevent the UAV 104 from properly identifying or reading the marker 130.

The sensors 204 can comprise one or more cameras, light sensors, or other means to enable the marker 130 to determine that it is upright, for example, and that there are no obstacles 134 within a predefined area. If the sensors 204 determine that there is very little light or that an object is very close to the lens, for example, then the marker 130 is either upside-down or has something covering it. In either case, the marker 130 can signal the UAV 104 to hold-position, for example, and provide messages to the user 136 to remedy the situation.

In some examples, as discussed below, the sensors 204 can also be light sensors. In this manner, the marker 130 can adapt to different light conditions. If it is very bright outside at the delivery time, for example, the marker 130 can increase the contrast and/or brightness of the display 202 to compensate. If a first portion of the display 202 is in the shade and second portion of the display 202 is in the sunlight, on the other hand, the marker 130 can adjust the screen contrast and/or brightness to even the appearance of the display 202 to the UAV 104 or user 136. If it is dark outside, the marker 130 can activate a backlight, side lights, or other illumination to increase visibility.

In some examples, the sensors 204 can also comprise proximity sensors. The proximity sensors can include laser range finders, ultrasonic sensors, or infrared sensors, for example, to enable the marker 130 to determine the distance from itself to other objects. Thus, if there is a tree 134 in the landing zone 128, but there is nonetheless sufficient distance from the marker 130 to the tree 134, then it may be irrelevant to UAV 104 operations, and vice-versa.

The sensors 204 can also comprise one or more atmospheric or meteorological sensors to provide data related to moisture, humidity, rainfall, wind speed and direction, barometric pressure, and/or other atmospheric or weather-related sensors to provide feedback about the conditions in the landing zone 128. If the grass is wet in the landing zone 128, for example, the UAV 104 may exercise extra care during landing to prevent slippage and/or water damage to the package 108. Similarly, if the sensors 204 indicate that the ground is saturated due to recent rainfall, the UAV 104 may drop the package on, or near, the marker 130 without landing.

The sensors 204 can also comprise a tilt sensor, gyro, or accelerometer to indicate when the marker 130 has been placed on uneven ground, for example, or even when the marker 130 is moving. If the ground is significantly sloped, for example, the UAV 104 may be unable to land. In this case, the marker 130 may display or play a message to request that the user 136 move the marker 130 to flatter ground. Similarly, if the marker 130 detects that it is being moved, the marker 130 may send a message to the UAV 104 to pause or abort until the marker 130 is repositioned and stationary.

In some examples, the speakers 206 can provide audio output for the marker 130 to enable the marker 130 to communicate with the user 136. The speakers 206 can be used to provide the user 136 with instructions, for example, or to alert the user 136 of impending landing or to correct an adverse condition in the landing zone 128. The speakers 206 can enable the marker 130 to ask the user 136, "Please move the marker 10 feet north to avoid an obstacle." The speakers 206 can enable the marker 130 to warn the user 136, "Please stand back, UAV approaching." The speakers 206 can also provide music, tones, warning chimes, and other audio to provide information to the user 136.

In some examples, to enable the marker 130 to be placed outside in any weather conditions, the marker 130 can be water resistant or waterproof. Thus, when it is raining or snowing outside, or the grass is wet with dew, the marker 130 can continue to function without damage.

Figure 2B:
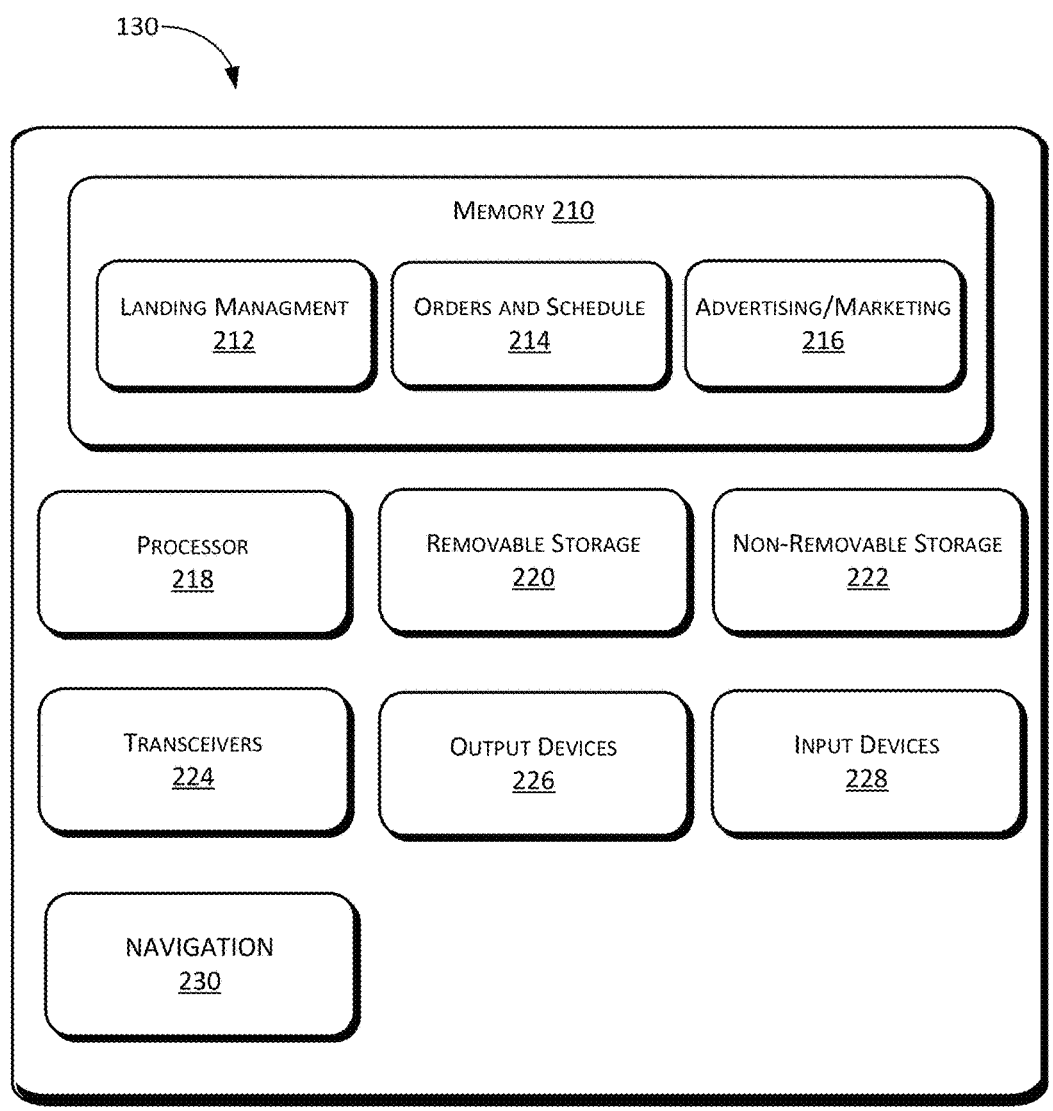
FIG. 2B is a schematic diagram of the components of the electronic marker of FIG. 2A, in accordance with some examples of the present disclosure.

As shown in FIG. 2B, the marker 130 can also comprise one or more internal components to enable the marker 130 to perform its functions. As discussed below, the marker 130 can comprise memory 210 configured to include computer-executable instructions including at least a landing management module 212, an order and scheduling module 606, and an advertising and marketing module 216. The marker 130 can also include one or more processor(s) 218, removable storage 220, non-removable storage 222, transceivers 224, output device(s) 226, input device(s) 228, and one or more navigational modules 230. The marker 130 may additionally contain a policy engine to receive, create, transmit, and manage the various messages and commands.

In various implementations, the memory 210 can be volatile (such as RAM), nonvolatile (such as ROM, flash memory, etc.), or some combination of the two. The memory 210 can also comprise the landing management module 212. The landing management module 212 can be used instead or, or in addition to, the navigation systems on the UAV 104. In some examples, upon receiving a notification from the UAV 104 that the UAV 104 has crossed the threshold distance 124, the marker 130 can begin displaying messages relevant to the user 136 and the UAV 104. The marker 130 may flash between a message to the user 136 to stand back, for example, and a landing symbol for the UAV 104 to direct the landing process. In some examples, the marker 130 may display information to the UAV 104 regarding current wind, temperature, and other atmospheric conditions, authentication data, and other relevant information.

In some examples, upon receiving a message that the UAV 104 has crossed the threshold distance 124, landing management module 212 in the marker 130 may take over control of the UAV 104 to guide it to land on, or near, the marker 130. At that point, the UAV 104 may simply provide location, altitude, and other relevant information to the marker 130 and receive commands from the marker 130 to affect the landing. This outsourcing may enable the UAV 104 to be lighter, simpler, and/or cheaper due to the reduced processing requirements.

In some examples, the memory 210 can also include the orders and scheduling module 214. As the name implies, the orders and scheduling module 214 can receive information from the central control 110, for example, related to the orders and delivery schedule for the user 136. If a user 136 is expecting several deliveries through the week, for example, the marker 130 can constantly, or periodically, display the delivery calendar and provide reminders when a delivery is imminent. In some examples, the marker 130 can display a message the night before a delivery that says, for example, "Don't forget you have a delivery coming tomorrow. Please place the marker outside no later than 11 AM."

Similarly, if the marker 130 determines that it has not been placed outside, the marker 130 may display additional messages such as, for example, "Please place the marker outside in the next 15 minutes. Failure to do so may result in your delivery being delayed." The marker 130 can work in concert with the central control 110 and the UAV 104 to coordinate deliveries and ensure that the UAV 104 is not forced to attempt a delivery without the marker 130 being properly placed and activated.

The memory 210 can also include an advertising and marketing module 216. In some examples, to offset the cost of the marker 130 and/or to generate advertising revenue, when not in use as a marker 130, the marker 130 can display advertising materials. If the marker 130 is unique to an online retailer, for example, the marker 130 may display advertising materials for that retailer. In some examples, the marker 130 can also display advertising materials relevant to the user 136 based on information from the orders and scheduling module 214. If a user 136 has ordered several tools from the same manufacturer, for example, the advertising and marketing module 216 may display information relevant to that manufacturer, among other things.

In some implementations, the processor(s) 218 can comprise a central processing unit (CPU), a graphics processing unit (GPU), or both a CPU and a GPU, or any other sort of processing unit. The processor 218 can be responsible for running software on the marker 130, including the aforementioned modules 204-208 and to interpret and send messages to the central control 110 and UAV 104. In some examples, the processor(s) 218 can also perform calculations and provide instructions to the user 136 and the UAV 104 based on the various inputs 228.

The marker 130 can also include additional data storage devices (removable and/or non-removable) such as, for example, magnetic disks, optical disks, or tape. Such additional storage is illustrated in FIG. 2B by removable storage 220 and non-removable storage 222. The removable storage 220 and non-removable storage 222 can store the various modules, programs, and algorithms for the navigation, landing, and advertising processes and can include routines for scheduling and canceling deliveries, among other things.

Non-transitory computer-readable media may include volatile and nonvolatile, removable and non-removable tangible, physical media implemented in technology for storage of information, such as computer readable instructions, data structures, program modules, or other data. The memory 210, removable storage 220, and non-removable storage 222 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the marker 130. Any such non-transitory computer-readable media may be part of the marker 130 or may be a separate device (e.g., a jump drive) or a separate database or databank (e.g. at the central control 110).

In some implementations, the transceivers 224 can include any sort of transceivers known in the art. For example, the transceivers 224 may include wired communication components, such as a wired modem or Ethernet port, for communicating with a LAN at the delivery location 106. Also, or instead, the transceivers 224 may include wireless modem(s) to facilitate wireless connectivity with the LAN, the central control 110, the UAV 104, the Internet, and/or an intranet. Further, the transceivers 224 may include a radio transceiver that performs the function of transmitting and receiving radio frequency communications via an antenna (e.g., Wi-Fi or Bluetooth®).

In some implementations, the output devices 226 can include any sort of output devices known in the art, such as a display (e.g., an LCD, LED, or TFT screen), a touchscreen display, lights, speakers, a vibrating mechanism, or a tactile feedback mechanism to provide interactive feedback to the user 136 and/or the UAV 104. In some examples, the output devices 226 can play various sounds based, for example, on whether the landing area is safe to enter, the UAV 104 has landed, or if there is an object preventing the UAV 104 from landing. Output devices 226 also include ports for one or more peripheral devices, such as headphones, peripheral speakers, or a peripheral display.

In various implementations, input devices 228 can include any sort of input devices known in the art. For example, input devices 228 may include a camera, a microphone, a keyboard/keypad/touchpad, a touch-sensitive display, a proximity sensor, and a tilt sensor. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the input devices 228 can also include communication ports.

The marker 130 can also comprise a navigation module 230. The navigation module 230 can comprise a GPS receiver, for example, a cellular transceiver with location services, a LORAN, or other navigational devices. The marker 130 can use the navigation module 230 to determine if it is properly placed outside for a UAV 104 approach, for example, to provide location information to the UAV 104 or central control 110, and/or to provide verification information to the UAV 104 (e.g., that the location of the marker 130 is coincident to the delivery location 106).

Figure 3:
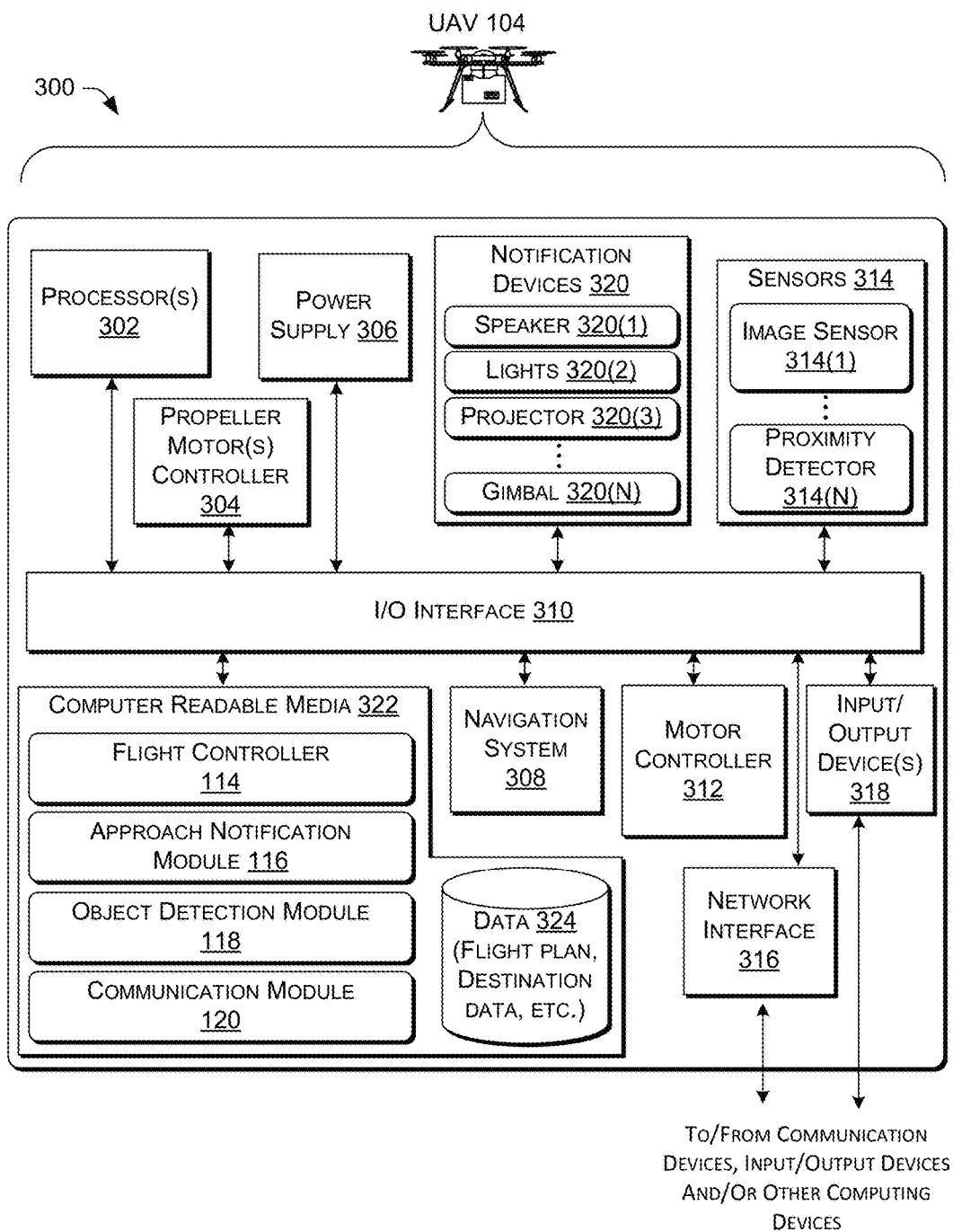
FIG. 3 is a schematic diagram of the UAV, in accordance with some examples of the present disclosure.

FIG. 3 is a block diagram of an illustrative UAV architecture 300 of the UAV 104. The UAV architecture 300 may be used to implement the various systems, devices, and techniques discussed above. In the illustrated implementation, the UAV architecture 300 includes one or more processors 302, a propeller motor controller 304, power supply module 306, a navigation system 308, and an input/output (I/O) interface 310. The UAV architecture 300 can also include a motor controller 312 to interact with the package 108, sensors 314, a network interface 316, one or more input/output devices 318, and notification devices 320.

In various implementations, the UAV architecture 300 may be implemented using a uniprocessor system including one processor 302, or a multiprocessor system including several processors 302 (e.g., two, four, eight, or another suitable number). The processor(s) 302 may be any suitable processor capable of executing instructions. In various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 302 may commonly, but not necessarily, implement the same ISA.

The propeller motor controller 304 communicates with the navigation system 308 and adjusts the power of each propeller motor to guide the UAV 104 along a determined flight path 122. The power supply module 306 may control the charging and any switching functions associated with one or more power modules (e.g., batteries) of the UAV 104.

The navigation system 308 may include a GPS or other similar system that can be used to navigate the UAV 104 to and/or from a location. The motor controller 312 communicates with the actuator(s) or motor(s) (e.g., a servo motor) used to engage and/or disengage the package 108 and other cargo. When the UAV 104 is positioned over a level surface at a delivery location, for example, the motor controller 312 can provide an instruction to a motor that controls cargo arms, for example, to release the package 108.

In one implementation, the I/O interface 310 may be configured to coordinate I/O traffic between the processor(s) 302, the non-transitory computer readable media 322, the network interface 316, or other peripheral interfaces, such as input/output devices 318. In some implementations, the I/O interface 310 may perform any necessary protocol, timing, or other data transformations to convert data signals from one component (e.g., the non-transitory computer readable media 322) into a format suitable for use by another component (e.g., the processor(s) 302). In some implementations, the I/O interface 310 may include support for devices attached through various types of peripheral buses, such as a variant of the Peripheral Component Interconnect (PCI) bus standard, for example, or the Universal Serial Bus (USB) standard. In some implementations, the function of the I/O interface 310 may be split into two or more separate components, such as, for example, a north bridge and a south bridge. Also, in some implementations, some or all of the functionality of the I/O interface 310, such as an interface to the non-transitory computer readable media 322, may be incorporated directly into the processor(s) 302.

The sensors 314 may include an image sensor 314(1), a proximity sensor 314(N), and/or other sensors used to detect obstacles 134, the marker 130, the user 136, and/or other items or objects. The sensors 314 may monitor actions performed by the user 136, for example, to indicate a response by the user 136 to a request issued by the UAV 104 or the marker 130 (e.g., "Please move away from the marker.").

The network interface 316 can be configured to allow data to be exchanged between the UAV architecture 300, other devices attached to a network, such as a computer at the user 136's house, the central control 110, the marker 130, and/or with UAV control systems of other UAVs 104. The network interface 316 may enable wireless communication between numerous UAVs, for example. In various implementations, the network interface 316 may support communication via wireless general data networks, such as a Wi-Fi or Bluetooth® network. In some examples, the network interface 316 may support communication via telecommunications networks such as cellular communication networks, satellite networks, and the like.

The input/output devices 318 may, in some implementations, include accelerometers, altimeters, thermometers, tilt sensors, gyros, and/or other input/output devices commonly used in aviation. Multiple input/output devices 318 may be present and controlled by the UAV architecture 300. One or more of these sensors may be utilized to assist in landings as well as avoiding obstacles during flight. The notification devices 320, which may be used for other purposes and may be a subset of the input/output devices 318, may include additional input/output devices. The notification devices 320 may include one or more of a speaker 320(1), lights 320(2), a projector 320(3), and/or a moveable mechanism (e.g., a gimbal component) 320(N). The moveable mechanism 320(N) may be any mechanism that enables the directing of a component on the UAV 104 to "point" in a particular direction, among other possible reasons/functions. The notification devices 320 may be used by approach notification module 116, the object detection module 118, and/or the communication module 120, as discussed herein.

The non-transitory computer readable media 322 may be configured to store executable instructions/modules, data, flight paths, and/or data items accessible by the processor(s) 302. In various implementations, the non-transitory computer readable media 322 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data, and/or flight paths may be received, sent, or stored on different types of computer-accessible media, such as non-transitory media, or on similar media separate from the non-transitory computer readable media 322. Generally speaking, a non-transitory, computer readable memory may include storage media or memory media such as flash memory (e.g., solid state memory), magnetic or optical media (e.g., disk) coupled to the UAV architecture 300 via the I/O interface 310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 316.

In some examples, the non-transitory computer readable media 322 may store the flight controller 114, the approach notification module 116, the object detection module 118, and the communication module 120. The components may access and/or write data 324, which may include flight plan data, log data, destination data, delivery times, missed deliveries, errors, and so forth. The operation of the flight controller 114, the approach notification module 116, the object detection module 118, and the communication module 120 are described above, and also below by way of various illustrative processes.

As shown in FIGS. 4A and 4B, examples of the present disclosure can also comprise a process 400 to deliver packages to a location via a UAV. At 402, the user 136 can order one or more products from the FC 102, for example, that will be delivered via the UAV 104. The FC 102 can process and package the products in the normal manner in preparation for delivery by the UAV 104. This can include, placing all of the products in a single package, for example, and attaching the package 108 to the UAV 104 for delivery.

At 404, the FC 102 can provide delivery information to the UAV 104 and/or to the marker 130. For the UAV 104, this can include the delivery location 106, for example, package weight, fragility (e.g., whether the package can be dropped or must be placed, and any relevant drop heights) any routing or weather information, and the scheduled delivery time. The central control 110 can also provide the UAV 104 with the address of the marker (e.g., a URL, IP, or e-mail address) and any authentication information to enable the UAV 104 to locate the proper marker 130.

Similarly, the central control 110 can provide package information to the marker 130, along with information related to the UAV 104. This can include, for example, package weight and size, the estimated delivery time, and UAV 104 information. The central control 110 may also provide identification and/or authentication information for the UAV 104 to the marker 130. This may include an address for the UAV 104 (e.g., a URL, IP, or e-mail address), a radio frequency, a tail number, or other information to enable the marker 130 to identify and verify the UAV 104, and vice-versa.

At 406, at a predetermined time prior to delivery, or notification time, the marker 130 can provide a delivery message. This can include any combination of sights and sounds to alert and inform the user 136. The delivery message can comprise displaying a message on the screen 202 (shown), playing a tone through the speakers 206, and/or flashing the lights 208 on the marker 130. The delivery message may also may include an ETA, for example, and a reminder to place the marker 130 in an appropriate location. In some examples, the notification time can begin just after midnight on the day of delivery, for example, so that the user 136 is prompted to place the marker 130 prior to leaving for work. In other examples, the marker 130 can simply display the message (or repeated messages with a countdown) such that the user 136 is provided a reasonable amount of time to place the marker 130 prior to the ETA (e.g., the notification time can be 10 minutes, 15 minutes, 30 minutes, etc. prior to the delivery time.)

At 408, the marker 130 can assess the landing zone 128. As discussed above, the marker 130 can use one or more sensors 204 to determine that (1) the marker 130 has been placed outside (2) on suitably level, firm ground and (3) that the landing zone 128 is substantially unobstructed. The marker 130 can include a camera or proximity sensor, for example, to determine whether any obstacles are in the landing flight path for the UAV 104. As discussed below, in some examples, if the marker 130 determines that it has not been placed in an appropriate location, it may send a message to the UAV 104 or the central control 110 to prevent the UAV 104 from taking off or landing.

At 410, optionally, if the marker 130 determines that there is an obstacle in the flight path of the UAV 104, the marker 130 may provide an adjustment message to provoke the user 136 to move the marker 130. The marker 130 can flash its lights 208, display a message on the display 202, and/or provide a voice command over the speakers 206, among other things. Based on information obtained by the sensors 204, for example, the marker 130 may provide guidance to the user 136 to "Please move the marker 10 feet to the right." In some examples, a tilt sensor in the marker 130 may determine that the marker 130 has been placed on too large of an incline. In this case, the marker 130 can simply display and/or play a message that says, "Please place the marker on flat ground."

At 412, in some examples, once the marker 130 has determined that it is outside and in an appropriate flat and obstruction free landing zone 128, the marker 130 can initially display a long-distance symbol 140a for the UAV 104. As the name implies, this can be a relatively simple and/or high-contrast symbol to enable the UAV to initially identify the correct marker 130. In some examples, the long-distance symbol 140a can comprise a large letter provided to the marker 130 by the central control 110 or the UAV 104. In this manner, the UAV 104 can locate the marker that is displaying an "M," for example, which differentiates it from a neighboring marker 130 displaying an "X."

In some examples, the long-distance symbol 140a can be provided to the marker 130 by the central control 110 at the time the order is placed, or sometime thereafter (but before the UAV 104 is scheduled to arrive). The marker 130 can display the long-distance symbol 140a beginning at a predetermined time before the UAV's 104 ETA (e.g., 5, 10, or 15 minutes), for example, or any time after the marker 130 has been placed outside. In some examples, the marker 130 can display the long-distance symbol 140a until the UAV 104 and the marker 130 are within communication range. In other examples, the marker 130 can display the long-distance symbol 140a until the ETA for the UAV 104, or a predetermined time before the ETA.

In some examples, at this stage, the marker 130 can also send a message to the UAV 104 or the central control 110 to indicate that it is ready to receive the UAV 104. In some examples, the UAV 104 may not leave the FC 102 until it has received this message from the marker 130 or the central control 110 to reduce the number of failed deliveries. In other words, if the UAV 104 leaves with the package 108, but the marker 130 is not outside or appropriately placed, then the UAV 104 may be unable to land at the delivery location 106 and may be forced to return to the FC 102 without delivering the package. This is obviously a waste of time and energy for the UAV 104 and the delivery system 100.

In other examples, the marker 130 can also provide periodic updates to the central control 110 or UAV 104 when the UAV 104 is en route. If conditions in the landing zone 128 preclude the UAV 104 landing—the landing zone 128 becomes obstructed (e.g., a tree falls into it), for example—the marker 130 can send a message to the UAV 104 to abort the delivery. In some cases, depending on whether the UAV 104 has crossed the threshold distance 124 (or some other boundary), for example, the UAV 104 may continue on its flight path 122 in the hope that the issue can be cleared by the user 136 prior to arrival. In some examples, the marker 130 can also provide final landing authority to the UAV 104 when it arrives on-scene. Regardless, the UAV 104, central control 110, and marker 130 can be in communication to provide periodic or real-time updates of local weather, landing zone 128, and other conditions to increase the efficiency of the delivery system 100.

At 414, when the UAV 104 has crossed the threshold distance 124, or is otherwise within range, the marker 130 and the UAV 104 can begin communications. In some examples, this can be achieved with a direct wireless link (e.g., Bluetooth®, Wi-Fi, or cellular) between the marker 130 and the UAV 104. In other examples, the UAV 104 may be in communication with the central control 110 via a wireless link, for example, and the marker 130 can be in communication with the central control 110 (and thus the UAV 104) via an Internet connection. In still other examples, the UAV 104 and the marker 130 can both be connected to a LAN at the delivery location (e.g., a home Wi-Fi router) and can communicate via the LAN. In some examples, the marker 130 can be connected to the central control 110 via the Internet and the UAV 104 via a wireless link enabling the marker 130 to act as a relay between the central control 110 and the UAV 104. This can enable the UAV 104 to be in communication with the central control 110 despite being otherwise out of communication range with the central control 110.

In some examples, the marker 130 and the UAV 104 can exchange authentication information (e.g., passwords, public/private keys, etc.) to ensure the UAV 104 has found the correct marker 130, and vice-versa. This information can be provided by the central control 110, for example, at the time the order is sent to the marker 130 and UAV 104 (at 404). In some examples, the UAV 104 can provide updated delivery information to the marker 130 for display to the customer, for example, and the marker 130 can provide local, accurate weather and landing information to the UAV 104, among other things.

In some examples, rather than relying solely on the marker 130 to assess the landing area, the UAV 104 may assess the landing zone 128 as it approaches in addition to, or instead of, the marker 130. In this configuration, the UAV 104 may hover above the landing zone 128, for example, and scan the landing zone 128 to identify any obstacles 134. The UAV 104 may assess the landing zone 128 with one or more cameras, proximity sensors, or other sensors to identify obstacles, difficult terrain, people, pets, and other adverse conditions in the landing zone. This can enable obstacles 134 that are out of range of the sensors 204 on the maker 130—e.g., they are too high above the marker 130—to nonetheless be detected.

If an obstacle 134 is located in the landing zone 128 that prevents the UAV 104 from landing, the UAV 104 can send a message to the marker 130, the central control 110, and/or the user 136. The UAV 104 can send a message to the marker 130, for example, to request that the marker 130 display a message to the user 136 (e.g., "Please move the marker 15 feet farther from the house.") based on information provided by the UAV 104. In other examples, the UAV 104, the central control 110, and/or the marker 130 can communicate with the user 136 via their electronic device 138, or by other means, in an attempt to resolve the adverse condition.

In some examples, the UAV 104 can maintain a hover above the landing zone 128 for a predetermined amount of time waiting for the marker 130 to be moved, for example, or the obstacle 134 to be removed. If the obstacle 134 or the marker 130 is moved to enable the UAV 104 to land, the UAV 104 can send a second message that the landing will commence. In response, the marker 130 may return to displaying the short-distance symbol 140*b*, for example, and/or a message to prevent the user 136 from entering the landing zone 128. If the user is not home, on the other hand, and the adverse condition cannot be resolved, then the UAV 104 may abort the delivery and send a message to the marker 130, central control 110, and/or user 136 to that effect.

At 416, based on the UAV 104 crossing the threshold distance 124, the marker 130 and UAV 104 establishing communications, or other relevant information, the marker 130 can change from the long-distance symbol 140*a* to the short-distance symbol 140*b*. The short-distance symbol 140*b* can comprise a more detailed pattern or message to provide additional information to the UAV 104. In some examples, the short-distance symbol 140*b* can comprise an alpha-numeric message, a 2- or 3D bar code, a QR code, or other symbol that includes encoded information about the landing zone, weather conditions, or other information relevant to the UAV 104.

In some examples, the short-distance symbol 140*b* can provide a second level of authentication to the UAV 104. So, for example, the long-distance symbol 140*a* can be used to give the UAV a first level of authentication and to ensure that the UAV 104 is likely going to the correct marker 130. Due to its relatively simple nature, however, the long-distance symbol 140*a* may be fairly easily duplicated. Thus, it is possible that people with dishonest intent (or even pranksters) could attempt to mislead the UAV 104. In this case, the marker 130 can display an additional, more complicated short-distance symbol 140*b* to provide additional authentication to the UAV 104. The short-distance symbol 140*b* can also be provided to the marker 130 by the central control 110 and can be encrypted, or otherwise secured, to ensure only the correct marker 130 has the pattern.

In some examples, the short-distance symbol 140*b* can also provide additional information to the UAV 104. In other words, additional information regarding the landing area, weather patterns, wind, barometric pressure, temperature, humidity, tilt angle of the marker 130, and other relevant information can also be included, or encoded, in the short-distance symbol 140*b*. In some examples, the marker 130 can also include a short-distance symbol 140*b* to identify conditions in the delivery location 106 that may preclude the landing and/or to "wave-off" the UAV 104 when these conditions arise. These conditions can include, for example, a person, pet, or other object, high winds, or other adverse conditions in the landing zone 128

In some examples, as discussed below, the marker 130 can alternate between displaying the short-distance symbol 140*b* and displaying other information. Due to the close proximity of the UAV 104 at this stage of the process 400, in some examples, the marker 130 can alternate between the short-distance symbol 140*b* and a warning message. In some examples, the display 202 of the marker 130 may flash red, for example, to inform the customer to stay away from the landing zone 128. The display 202 may also include an ETA countdown based on when the UAV 104 will actually touch down. In some examples, the marker 130 can also play a message over the speakers 206, flash the lights 208, or use other audio or visual warnings to warn the user 136 to stay back.

In some examples, as the UAV 104 approaches the marker 130 for landing, the marker 130 can activate the sensors 204 (e.g., a high-resolution video camera) to provide some feedback on the health of the UAV 104. In other words, if the UAV 104 is missing a part (e.g., a portion of the landing gear has fallen off), the marker 130 can provide this information to the UAV 104 and/or the central control 110. In some examples, depending on the severity of the damage, the UAV 104 may abort the delivery and return to the FC 102 for repairs to avoid a potentially dangerous landing.

At 418, the marker 130 and/or the UAV 104 can confirm the landing of the UAV on, or near, the marker 130. In some examples, the display 202 of the marker 130 can comprise a touchscreen to detect the UAV 104 and/or package 108 touching down on the display 202. In other examples, the UAV 104 can send a message to the marker 130 and/or the central control 110 when the UAVs altimeter reads zero altitude, for example, or when the propeller motor controller 304 deactivates the propulsion system. In some examples, a weight sensor or other means in the marker 130 can detect the weight of the UAV 104 and/or the package 108 on the marker 130.

As shown in FIG. 5, examples of the present disclosure can also comprise a process 500 for enabling the UAV 104 to efficiently leave the package and depart back to the FC 102. At 502, the marker 130 can detect the take-off of the UAV 104. In some examples, this can be accomplished using the display 202 (e.g., a touchscreen) of the marker 130. In other examples, the marker 130 can include a weight sensor, strain gauge, or other means to detect the change in weight between the UAV 104 with the package 108 and the package 108 alone. In other examples, because the UAV 104, marker 130, and/or central control 110 are in communication, the UAV 104 can simply tell the marker (directly or indirectly) that is has taken off. In still other examples, the marker 130 can use the previously provided weight of the package 108 to determine that the UAV 104 has taken off (i.e., that only the weight of the package 108 remains).

At 504, the UAV 104 can communicate to the marker 130 that it has reached a predetermined height and/or distance from the marker 130. In some examples, the UAV 104 can send a message to the marker 130 when the UAV 104 has (re-)crossed the threshold distance 124. In other examples, the UAV 104 can simply inform the marker 130 that it has reached a predetermined height (e.g., 50 or 100 feet) above the delivery location 106. Regardless of the actual metric, the UAV 104 can send a message to the marker 130 that it is safe for the user 136 to enter the landing zone 128 to retrieve the package.

At 506, the display 202 of the marker 130 can change from the short-distance symbol 140*b* and any warning message to an "all-clear" message and/or other information. Since the UAV 104 has substantially cleared the area, the display 202 of the marker 130 may flash, or stay, green, for example, to inform the customer it is safe to enter the landing zone 128 to retrieve the package 108. In some examples, the marker 130 can also play a message over the speakers 206, flash the lights 208, or use other audio or visual warnings to inform the user 136 that the landing zone 128 is clear.

At 508, in some examples, the marker 130 can simply revert back to its normal standby mode (e.g., displaying advertisements or web browsing). In some examples, the marker 130 may also provide the user 136 with the opportunity to provide feedback about the delivery process. If the package 108 appears to be overtly damaged, for example, the user 136 can provide this feedback on the display 202 of the marker 130. In some examples, the marker 130 can communicate with the UAV 104 and/or the central control 110 to affect an almost immediate return (e.g., the UAV 104 can return to the landing zone 128 to retrieve the damaged package 108). In other examples, the marker 130 can provide on-screen instructions regarding the return.

Figure 6A:
FIGS. 6A-6C depict various display screens for the electronic marker, in accordance with some examples of the present disclosure.
Figure 6B:
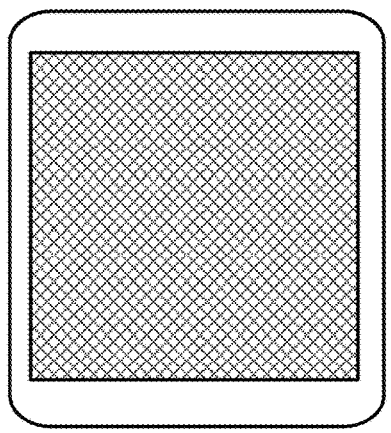
Figure 6C:
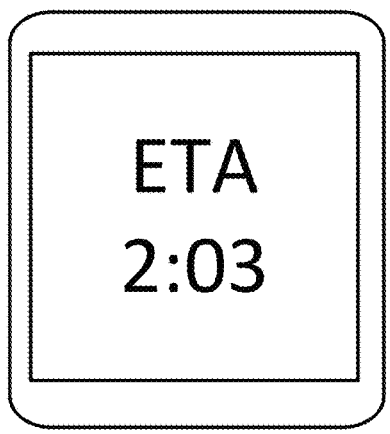

As shown in FIGS. 6A-6C, in some examples, during use, the marker 130 can switch between screens during use to provide multiple services. The marker 130 can switch between displaying the short-distance symbol 140*b*, for example, a warning (or all-clear) screen, and the ETA for the UAV 104. As the UAV 104 approaches, for examples, the marker 130 can alternate between the short-distance symbol 140*b* to provide information or authentication to the UAV 104 (FIG. 6A), a red screen (depicted as a cross-hatch in the figure) to warn the user 136 to stay out of the landing zone 128 (FIG. 6B), and an ETA for the UAV 104 to inform the user 136 (FIG. 6C).

Of course, the marker 130 can also alternate between other screens depending on the current activity. As discussed above, the marker 130 may switch between different screens for the landing process, the take-off process, and during normal use. The marker 130 can switch between screens at a predetermined rate (e.g., 1, 2, or 5 seconds) sufficient for each screen to serve its intended purpose. In some examples, the screens may be customizable by the user 136 to meet their particular needs or uses of the marker 130.

Figure 7B:
FIGS. 7A and 7B depict a long-distance symbol and a short-distance symbol, respectively, displayed by the electronic marker, in accordance with some examples of the present disclosure.
Figure 7A:
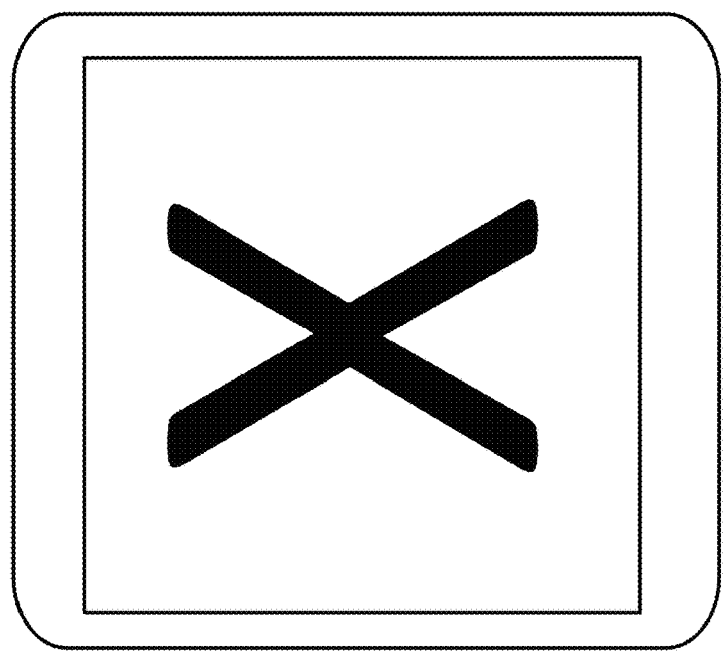

As discussed above, the marker 130 can include one or more long-distance symbols 140*a* (FIG. 7A) and one or more short-distance symbols 140*b* (FIG. 7B). The long-distance symbols 140*a* can include relatively simple, bold symbols that are easily identifiable by the camera, or other sensors, on the UAV 104. The long-distance symbols 140*a* can comprise letters, crosses, parallel lines, or other patterns or symbols that have relatively simple outlines and/or high contrast.

The short-distance symbols 140*b*, on the other hand, can comprise more complicated and/or information intensive letters, or symbols that can be better interpreted as the UAV 104 approaches the delivery location 106. In some examples, the short-distance symbols 140*b* can comprise 2D- or 3D barcodes, QR codes, alphanumeric messages, or other letters, numbers, or symbols. In some examples, the short-distance symbols 140*b* can provide authentication information from the marker 130 to the UAV 104. In other examples, the short-distance symbols 140*b* can include information or data from the central control 110 to the UAV 104. In still other embodiments, the short-distance symbols 140*b* can also include weather, location, and other local information from the marker 130, the electronic device 138, the user 136, or the LAN at the delivery location 106, among other things.

Of course, some UAVs 104, deliver locations 106, or delivery systems 100 may not require the additional authentication and/or information provided by the long-distance symbols 140a and the short-distance symbols 140b. A UAV 104 with a very high-resolution camera, for example, may be able to identify the short-distance symbols 140b from very far away, obviating the need for the long-distance symbols 140a. Indeed, a UAV 104 with sufficient optics may be able to identify the house number on the house or even the serial number on the marker 130. Similarly, in a new delivery system 100 with relatively few markers 130, or a UAV 104 with a sophisticated navigation system, additional authentication and information may not be needed, obviating the need for the short-distance symbols 140b.

Of course, while examples of the present disclosure have been discussed with respect to a long-distance symbol 140a and a short-distance symbol 140b, other symbols 140 could also be used before or after the long-distance symbol 140a and a short-distance symbol 140b. As shown in FIGS. 8A-8D, in some examples, the system 100 can use four or more symbols 140 at various stages of the mission.

Figure 8A:
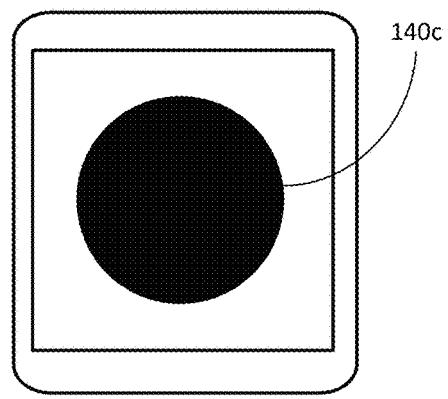
FIGS. 8A-8D depict a preliminary symbol, a long-distance symbol, an intermediate symbol, and a short-distance symbol, respectively, in accordance with some examples of the present disclosure.

FIG. 8A, in some examples, the marker 130 may first display a preliminary symbol 140c. In some examples, the preliminary symbol 140c may simply comprise an even simpler, larger, or bolder symbol 140 than the long-distance symbol 140a. The preliminary symbol 140c may comprise a bullseye, for example, a circle, or other simple shape that can be detected from a very long distance. In other examples, the preliminary symbol 140c may be purely for the user 136 because the UAV 104 is too far away to see the marker 130. The preliminary symbol 140c may include a simple message to the user 136 such as, for example, "Delivery en route." In this configuration, the preliminary symbol 140c may also include an ETA for the UAV 104.

Figure 8B:
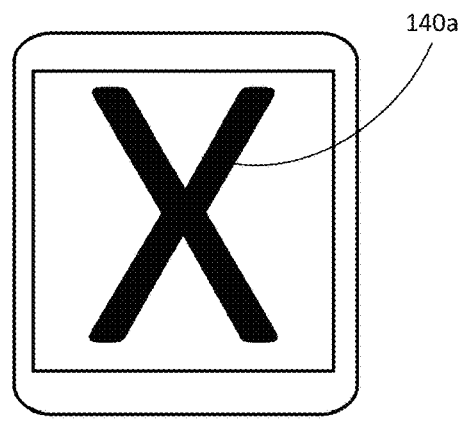

As shown in FIG. 8B, in some examples, the long-distance symbol 140a can then be displayed until the UAV 104 crosses the threshold distance 124 (or other mission stage). In some examples, the long-distance symbol 140a may be slightly more complicated than the preliminary symbol 140c to provide additional information. In other examples, the preliminary symbol 140c may be directed to the user 136, while the long-distance symbol 140a may be directed to the UAV 104. As mentioned above, the long-distance symbol 140a can enable the UAV 104 to identify the correct marker 130, for example, when there are many markers 130 in the area.

Figure 8C:
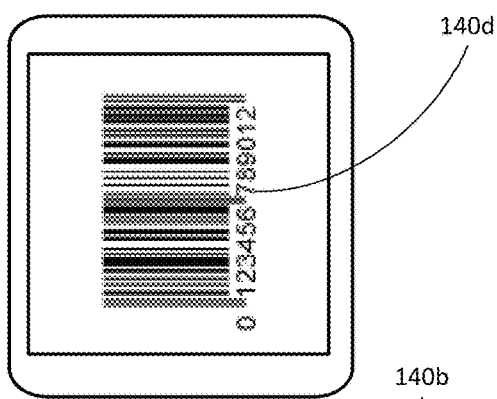

As shown in FIG. 8C, after the UAV 104 crosses the threshold, the marker 130 can display an intermediate symbol 140d. The intermediate symbol 140d could be used for authentication, for example, or to provide information to the UAV 104 regarding the landing zone 128. The UAV 104 may hover above the landing zone 128, for example, and read the intermediate symbol 140d to validate the marker 130 as the marker 130 associated with the delivery. In some examples, the UAV 104 may also provide authentication information to the marker 130.

Figure 8D:
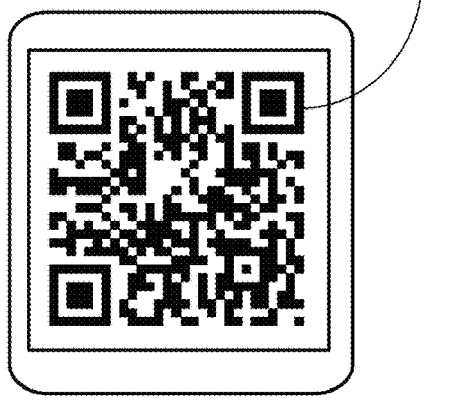

As shown in FIG. 8D, once authentication of the marker 130 and/or the UAV 104 has been achieved, the marker 130 can then display the short-distance symbol 140b. As mentioned above, the short-distance symbol 104b can provide authentication, landing zone 128, and other information to the UAV 104. Of course, one of skill in the art will recognize that more or less symbols 140 could be used during a delivery to serve various purposes. The use of two or four symbols 140 is merely explanatory and not intended to limit the scope of the invention.

Figure 9:
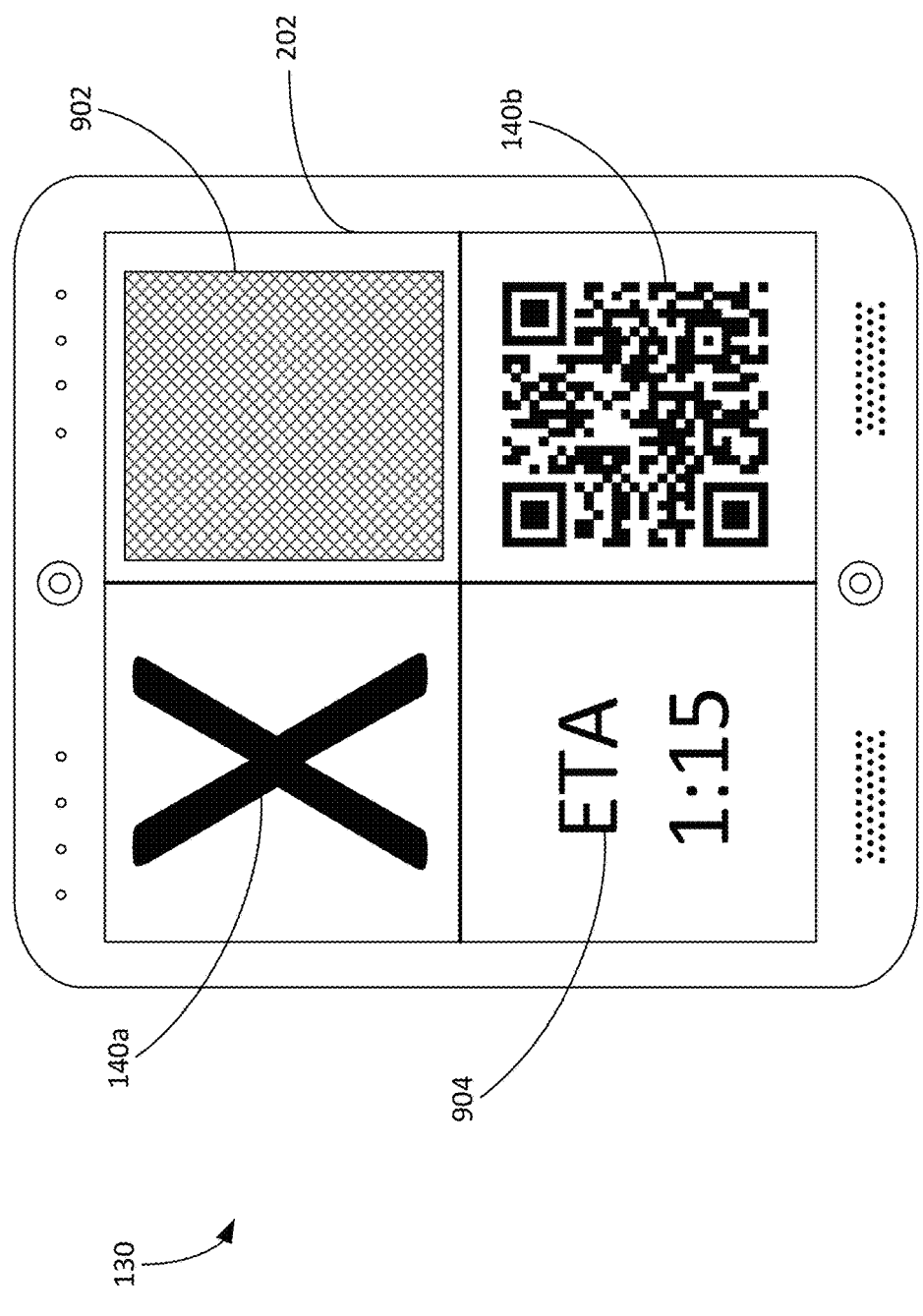
FIG. 9 depicts the electronic marker in split-screen mode, in accordance with some examples of the present disclosure.

As shown in FIG. 9, in some examples, rather than displaying a single symbol or message at a time on the screen 202 of the marker 130, in some examples, the marker 130 can comprise a split-screen function to enable multiple items to be displayed at the same time. This can enable the marker 130 to serve several functions at the same time without alternating the screens 202, for example. The marker 130 can display, for example, a long-distance symbol 140a, a short-distance symbol 140b, an alert symbol 902 (e.g., a red or green screen indicating the condition of the landing zone 128), and an ETA 904.

In this manner, the user does not have to "catch" a message intended for them before it disappears, for example, because it is displayed constantly. In addition, this may reduce the amount of information required by the marker 130. If the marker 130 displays both the long-distance symbol 140a and the short-distance symbol 140b continuously, for example, the marker 130 does not need to know when the UAV 104 crosses the threshold distance 124. In this manner, the UAV 104 can simply switch from the long-distance symbol 140a to the short-distance symbol 140b when it comes within detectable range, and vice-versa.

Figure 10:
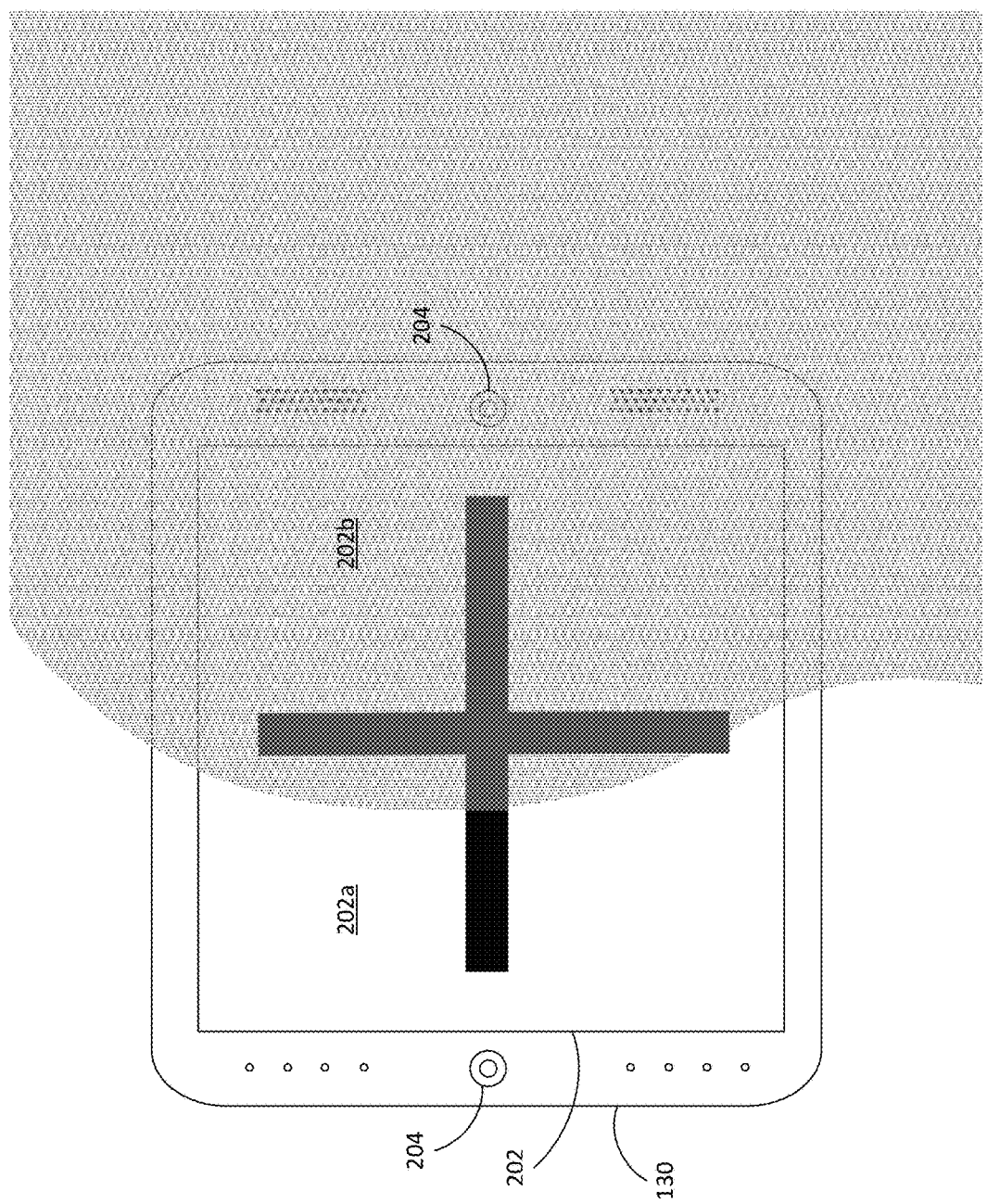
FIG. 10 depicts the electronic marker adjusting the display for a partially shaded environment, in accordance with some examples of the present disclosure.

As shown in FIG. 10, in some examples, the marker 130 can use the one or more sensors 204 (e.g., a camera or light sensor) to make visibility adjustments to the display 202. If, for example, the marker 130 is placed outside in a partially shaded area, for example, the marker 130 can adjust the resolution, brightness, contrast, and/or color of a first portion 202a of the display 202 when compared to a second portion 202b of the display 202. Similarly, if the entire display 202 is outside on a bright, sunny day, the marker 130 can increase the contrast or brightness, or use a darker color, for example, to increase the visibility of the marker 130 for the UAV 104.

While several possible examples are disclosed above, examples of the present disclosure are not so limited. For instance, while systems and methods for delivering packages with UAVs 104 has been disclosed, other devices could be used to deliver packages 108, and other items could be delivered in a similar manner, without departing from the spirit of the disclosure. In addition, the location and configuration used for various features of examples of the present disclosure such as, for example, the order of steps, the components of the delivery system 100 or the marker 130, and the materials used can be varied according to a particular UAV 104, marker 130, or landing zone 128 that requires a slight variation due to, for example, the size or construction of the marker 130, the fragility of the packages 108, and/or the landing zone 128 conditions (e.g., special considerations may be required for crowded urban areas when compared to rural areas). Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method to guide an unmanned aerial vehicle (UAV) delivering a package to a delivery location, the method comprising:
   receiving a signal from a central control at an electronic marker that a package has been scheduled for delivery at a delivery time at a delivery location associated with the electronic marker;
   displaying a message to a user, at a notification time which is prior to the delivery time, on a screen of the electronic marker to place the electronic marker in a first location proximate a landing zone;
   identifying one or more conditions in the landing zone with one or more sensors on the electronic marker;
   providing a message to the user with the electronic marker to place the electronic marker in a second location proximate to the landing zone to remedy at least one adverse condition of the one or more conditions in the landing zone;
   displaying one or more symbols on the screen of the electronic marker to provide information related to the one or more conditions in the landing zone to the UAV, wherein the UAV is configured to detect the one or more symbols and approach the landing zone based at least in part on the one or more symbols; and
   determining, with the one or more sensors, that at least one of the UAV and the package has landed on or near the electronic marker.

2. The method of claim 1, wherein displaying the one or more symbols on the screen of the electronic marker to provide information to the UAV further comprises at least:
   displaying a long-distance symbol prior to the UAV crossing a threshold distance from the landing zone; and
   displaying a short-distance symbol after the UAV crosses the threshold distance.

3. The method of claim 2, wherein displaying a short-distance symbol after the UAV crosses the threshold distance from the landing zone comprises displaying a short-distance symbol that includes encoded information regarding at least one of the landing zone or conditions in the landing zone.

4. The method of claim 1, wherein identifying the one or more conditions in the landing zone with the one or more sensors on the electronic marker comprises identifying a sloped landing zone in the first location with a tilt sensor in the electronic marker.

5. The method of claim 1, wherein identifying the one or more conditions in the landing zone with the one or more sensors on the electronic marker comprises identifying one or more obstructions in the landing zone with a camera or proximity sensor on the electronic marker.

6. An electronic marker comprising:
   a display to display messages to a user, an unmanned aerial vehicle (UAV), or both;
   one or more sensors to detect conditions proximate to the electronic marker;
   one or more processors in communication with at least the display and the one or more sensors; and
   memory storing computer-executable instructions that, when executed, cause the one or more processors to perform acts to:
      determine that an obstacle is located at a delivery location or adjacent to the delivery location based on sensor data provided by the one or more sensors;
      select an indicator on the electronic marker to communicate to the user to move the electronic marker or the obstacle;
      determine that the UAV is within a threshold distance from a delivery location based on the sensor data from the one or more sensors, data from the UAV, or both; and
      cause the display to display one or more symbols to enable the UAV to deliver a package at the delivery location, wherein the UAV is configured to detect the one or more symbols and approach the delivery location based at least in part on the one or more symbols.

7. The electronic marker of claim 6, further comprising:
   a transceiver to enable the electronic marker to communicate with a central control, the UAV, or both;
   wherein determining that the UAV is within a threshold distance from the delivery location comprises receiving a signal from the central control or the UAV.

8. The electronic marker of claim 7, wherein the one or more processors further perform acts to:
   determine that the obstacle is still located at a delivery location or adjacent to the delivery location based on sensor data provided by the one or more sensors; and
   cause the transceiver to send a signal to the UAV to abort a delivery at the delivery location.

9. The electronic marker of claim 7, wherein the one or more processors further perform acts to:
   cause the display to display one or more long-distance symbols to enable the UAV to identify the delivery location prior to receiving the signal; and
   cause the display to display one or more short-distance symbols including information related to at least one of (1) landing zone conditions or (2) authentication after receiving the signal.

10. The electronic marker of claim 9, wherein the one or more short-distance symbols include information to enable the electronic marker to authenticate the UAV, the UAV to authenticate the electronic marker, or both.

11. The electronic marker of claim 9, wherein the one or more processors further perform acts to:
   cause the display to display an intermediate symbol to enable the UAV to authenticate the electronic marker, the electronic marker to authenticate the UAV, or both.

12. The electronic marker of claim 11, wherein the information associated with the delivery location comprises data associated with one or more atmospheric or meteorological conditions at the delivery location.

13. The electronic marker of claim 9, wherein the one or more short-distance symbols comprise coded information.

14. A method comprising:
   receiving a signal from a central control at a marker that a package has been scheduled for delivery at a delivery time by an unmanned aerial vehicle (UAV) at a delivery location associated with the marker;
   providing a message at a notification time, which is prior to the delivery time to a user with the marker to place the marker in a first location proximate to a landing zone for the UAV;
   determining with one or more sensors on the marker that the marker has been placed in the landing zone;
   sending a signal from the marker to the central control that the marker has been placed in the landing zone; and
   displaying one or more symbols on the marker to provide information to the UAV, wherein the UAV is configured to detect the one or more symbols and approach the delivery location based at least in part on the one or more symbols.

15. The method of claim 14, wherein displaying one or more symbols on the marker to provide information to the UAV further comprises:
- displaying a long-distance symbol on the marker to enable the UAV to identify the delivery location;
- receiving a signal from the UAV, the central control, or both that the UAV has crossed a threshold distance relative to the delivery location;
- displaying an intermediate symbol on the marker;
- receiving a signal from the UAV, the central control, or both that the UAV is prepared to land in the landing zone; and
- displaying a short-distance symbol on the marker to provide the UAV with information related to at least one of (1) landing zone conditions or (2) authentication.

16. The method of claim 15, further comprising:
- determining, with the one or more sensors on the marker, the UAV, or both, that the UAV has taken off from a location proximate to the marker;
- receiving a signal from the UAV, the central control, or both, that the UAV has re-crossed the threshold distance relative to the delivery location; and
- providing a message to the user with the marker to retrieve the package.

17. The method of claim 14, wherein displaying one or more symbols on the marker to provide information to the UAV further comprises:
- displaying a short-distance symbol on the marker to provide the UAV with information related to at least one of (1) landing zone conditions or (2) authentication; and
- providing a message to the user to stay clear of the landing zone.

18. The method of claim 14, wherein displaying one or more symbols on the marker to provide information to the UAV further comprises:
- displaying a short-distance symbol on the marker to provide the UAV with information related to at least one of (1) landing zone conditions or (2) authentication;
- providing a warning message to inform the user to stay clear of the landing zone; and
- providing an estimated time of arrival (ETA) for the UAV with the marker.

19. The method of claim 18, further comprising:
- receiving a message from the UAV indicating that the UAV has identified an obstacle in a first location in the landing zone; and
- providing a message to the user to place the marker in a second location proximate to the landing zone to avoid the obstacle.

20. The method of claim 14, further comprising:
- identifying, with the one or more sensors on the marker, the UAV, or both, an obstacle in a first location in the landing zone; and
- displaying a message to the user, on a screen of the marker, to place the marker in a second location proximate to the landing zone to avoid the obstacle.

* * * * *